(12) United States Patent
Weiler

(10) Patent No.: US 7,992,704 B2
(45) Date of Patent: Aug. 9, 2011

(54) CONVEYOR CLEAN-OUT FOR MATERIAL TRANSPORT VEHICLES

(75) Inventor: Patrick J. Weiler, Pella, IA (US)

(73) Assignee: Weiler, Inc., Knoxville, IA (US)

( * ) Notice: Subject to any disclaimer, the term of this patent is extended or adjusted under 35 U.S.C. 154(b) by 543 days.

(21) Appl. No.: 12/188,027

(22) Filed: Aug. 7, 2008

(65) Prior Publication Data

US 2010/0034627 A1    Feb. 11, 2010

(51) Int. Cl.
*B65G 47/00*    (2006.01)
*B65G 65/34*    (2006.01)
*B65G 15/26*    (2006.01)
*B65G 47/74*    (2006.01)
*B65G 21/00*    (2006.01)
*B65G 1/00*    (2006.01)

(52) U.S. Cl. ............... 198/735.4; 198/534; 198/550.01; 198/313; 198/632; 198/861.2; 414/346; 417/234; 417/360; 417/900

(58) Field of Classification Search .................. None
See application file for complete search history.

(56) References Cited

U.S. PATENT DOCUMENTS

| | | |
|---|---|---|
| 3,795,308 A | 3/1974 | Oury |
| 3,983,888 A | 10/1976 | Edwards |
| 4,182,444 A | 1/1980 | Fisher |
| 4,927,003 A | 5/1990 | Swinderman et al. |
| 5,015,120 A * | 5/1991 | Brock et al. .................. 404/108 |
| 5,044,484 A | 9/1991 | Douglas |
| 5,360,097 A | 11/1994 | Hibbs |
| 5,443,351 A | 8/1995 | Pettijohn |
| 6,733,247 B2 * | 5/2004 | Dwyer et al. ................. 417/234 |
| 6,823,983 B2 | 11/2004 | DeVries |
| 7,160,056 B1 * | 1/2007 | Hoffmann et al. ............ 404/109 |
| 7,261,200 B1 | 8/2007 | Kemper |

FOREIGN PATENT DOCUMENTS

EP    0 305 150 A2    3/1989

* cited by examiner

*Primary Examiner* — Gene Crawford
*Assistant Examiner* — Yolanda Cumbess
(74) *Attorney, Agent, or Firm* — Brown Winick Law Firm

(57) ABSTRACT

An improved material transport vehicle having an integrated assembly for cleaning out conveyors, elevators, hoppers and the like, and method for clean-out utilizing the same. The cleanout assembly comprises one or more detachable panels strategically located about the material transport vehicle, and means for releasing the same, so as to permit convenient and safe access to the components for removing unused, old or dried material. The detachable panel or panels are integral with a surface of the housings, typically the lower surface thereof.

18 Claims, 7 Drawing Sheets

CONVEYOR CLEAN-OUT FOR MATERIAL TRANSPORT VEHICLES

CROSS-REFERENCE TO RELATED APPLICATIONS

None

BACKGROUND OF THE INVENTION

1. Field of the Invention

The present invention relates generally to the delivery of hot mix asphalt for road bed construction and more particularly to an assembly and method for cleaning out conveyors, elevators, hoppers and other parts of material transport vehicles or other implements and devices associated with the delivery of hot mix asphalt to paving machines.

2. Description of the Prior Art

Hot mix asphalt (HMA) is typically prepared off-site from a road bed undergoing construction or resurfacing, or other similar paving project. It is then transferred into a dump truck or other suitable conveyance before being delivered either directly into a paving machine, directly into to a material transport vehicle, or placed onto the road bed as a windrow ahead of, and to be advanced upon, by a material transport vehicle. Material transport vehicles are known in the art, as are methods for cleaning out the same. Not surprisingly, unused, old or dried material will inhibit the ability of the material transport vehicle and related equipment to effectively deliver HMA to a paving machine and such material must be removed, preferably while still warm. Material transport vehicles also need to be cleaned out in order to facilitate routine maintenance as well as repair. Such methods include utilizing scrapers or brushes, both of which are prone to fatigue and failure. Furthermore, accessing the interior of the vehicle while the HMA is hot, though necessary for easy material removal, is potentially quite hazardous for operators. Previous access panels were either small, difficult to release, or otherwise exposed operators to excessive risk.

It is a first object of the present invention to create a cleanout assembly that permits the convenient, safe, efficient and complete cleaning of material transport vehicles as compared to previous devices;

It is a further object of the present invention to create a cleanout assembly that is inexpensive to manufacture, easy to maintain and operate, and that can be retrofitted to existing material transport vehicles.

It is yet a further object of the present invention to create an improved method for cleaning unused, old or dried material such as HMA from a material transport vehicle.

SUMMARY OF THE INVENTION

The present invention is an improved material transport vehicle having an integrated assembly for cleaning out conveyors, elevators, hoppers and the like. The cleanout assembly comprises one or more detachable panels strategically located about the material transport vehicle so as to permit convenient and safe access to the components for removing unused, old or dried material. In a preferred embodiment, the cleanout assembly has detachable panels integrated into the various interconnected housings containing conventional vehicle components such as an elevator conveyor, a transport conveyor, a dump hopper and a re-mix hopper. The detachable panel or panels are integral with a surface of the housings, typically the lower surface thereof.

The lower surface of the transport conveyor housing, for example, proximate the discharge end of the material transport vehicle, preferably has an outer detachable panel and an inner detachable panel. The outer panel is hingedly attached at one end to the housing and may be lowered to the ground at the second end. The inner panel, also hingedly attached at one end, is closest the conveyor chain when closed and, when lowered, rests on and is supported by the outer panel. The usually bidirectional conveyor is actuated in either or both directions. As the conveyor passes over the void created by the lowering of the inner panel, loose or generally loose material falls by operation of gravity onto the inner panel where it can be removed by workers using shovels or other suitable hand tools or dislodged merely by driving the vehicle away from the pile.

Additional housings, such as those containing the elevator conveyor, the dump hopper and the re-mix hopper, may be provided with one or more detachable panels in a similar fashion. The panels are generally releasable from their respective housings by simply actuating a remote latch. All such panels are also wider than the prior art, preferably as wide as or substantially as wide as the housings themselves, thereby improving accessibility and at the same time improving safety.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED AND OTHER EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

A material transport vehicle (MTV) such as a Weiler® Elevator (FIVE STAR INDUSTRIES, INC., Knoxville, Iowa) is typically used to transfer paving material such as hot-mix asphalt (HMA) from a dump truck or other conveyance to a conventional asphalt paving machine. Paving material is loaded into a first hopper of the MTV at an input end, delivered via an elevator to a second hopper, where it is mixed, agitated or simply maintained until needed, at which time it is delivered via a conveyor to a discharge end, usually to a paving machine.

Figure 1:
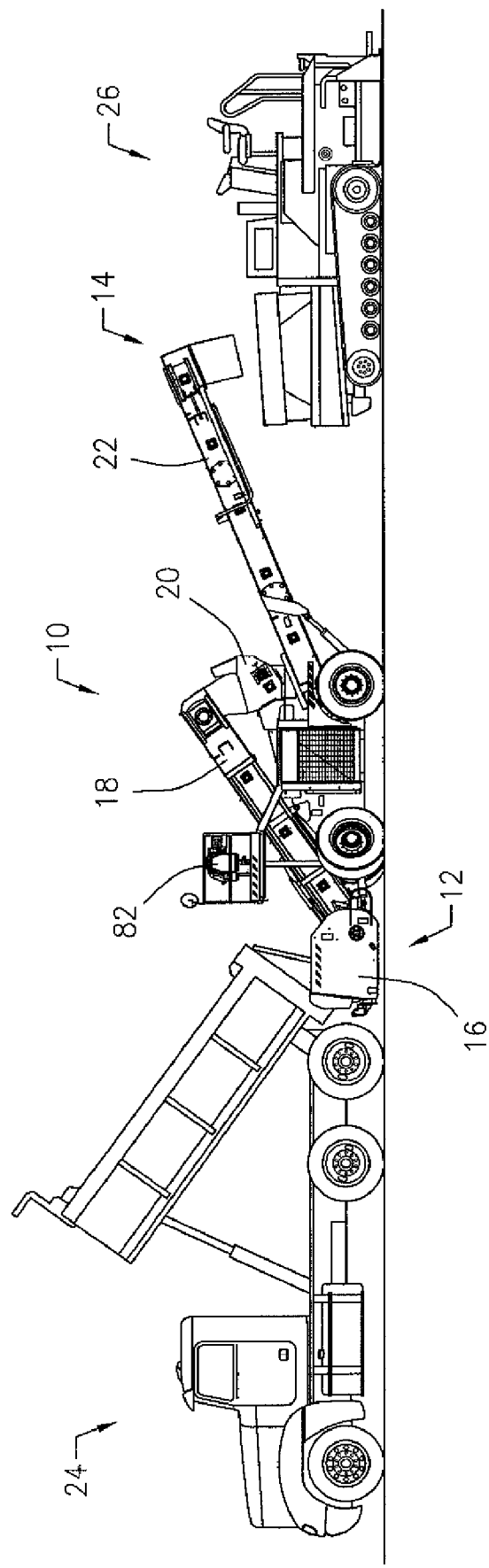
FIG. 1 is a side perspective view showing a material transport vehicle utilizing the cleanout assembly of the present invention.

Turning now to FIG. 1, a material transport vehicle (MTV) 10 generally has an input end 12 and a discharge end 14. A dump hopper 16 is situated at input end 12. Elevating conveyor 18 is connected to and extends upwardly from dump hopper 16, terminating at a re-mix hopper 20, with which elevating conveyor 18 is also connected. Transport conveyor 22 is connected to and extends horizontally from beneath re-mix hopper 20, terminating at discharge end 14. Shown for illustrative purposes only are dump truck 24, parked near input end 12, and conventional asphalt paving machine 26, parked near discharge end 14.

In normal operation, elevating conveyor 18 is inclined, originating at dump hopper 16 which is at or near ground level. Dump hopper 16 is capable of tilting or pivoting about its point of connection with elevator conveyor 18 so as to more effectively deliver paving material thereto. Alternatively, dump hopper 16 may be configured with an open front end (opposite elevator conveyor 18) so as to receive paving material dumped onto the road bed such as in a windrow and deliver the same into elevator conveyor 18 as vehicle 10 advances. The end of elevating conveyor 18 opposite dump hopper 16 is situated at approximately 45° from vertical and terminates at re-mix hopper 20. Beginning from a point directly beneath re-mix hopper 20, transport conveyor 22 may extend horizontally such that transport conveyor 22 is level or substantially level with the ground. Transport conveyor 22 can be raised or lowered as it pivots vertically about its point of attachment with MTV 10 via a hydraulic lift cylinder or other mechanism that is conventional and known in the art.

Figure 2:
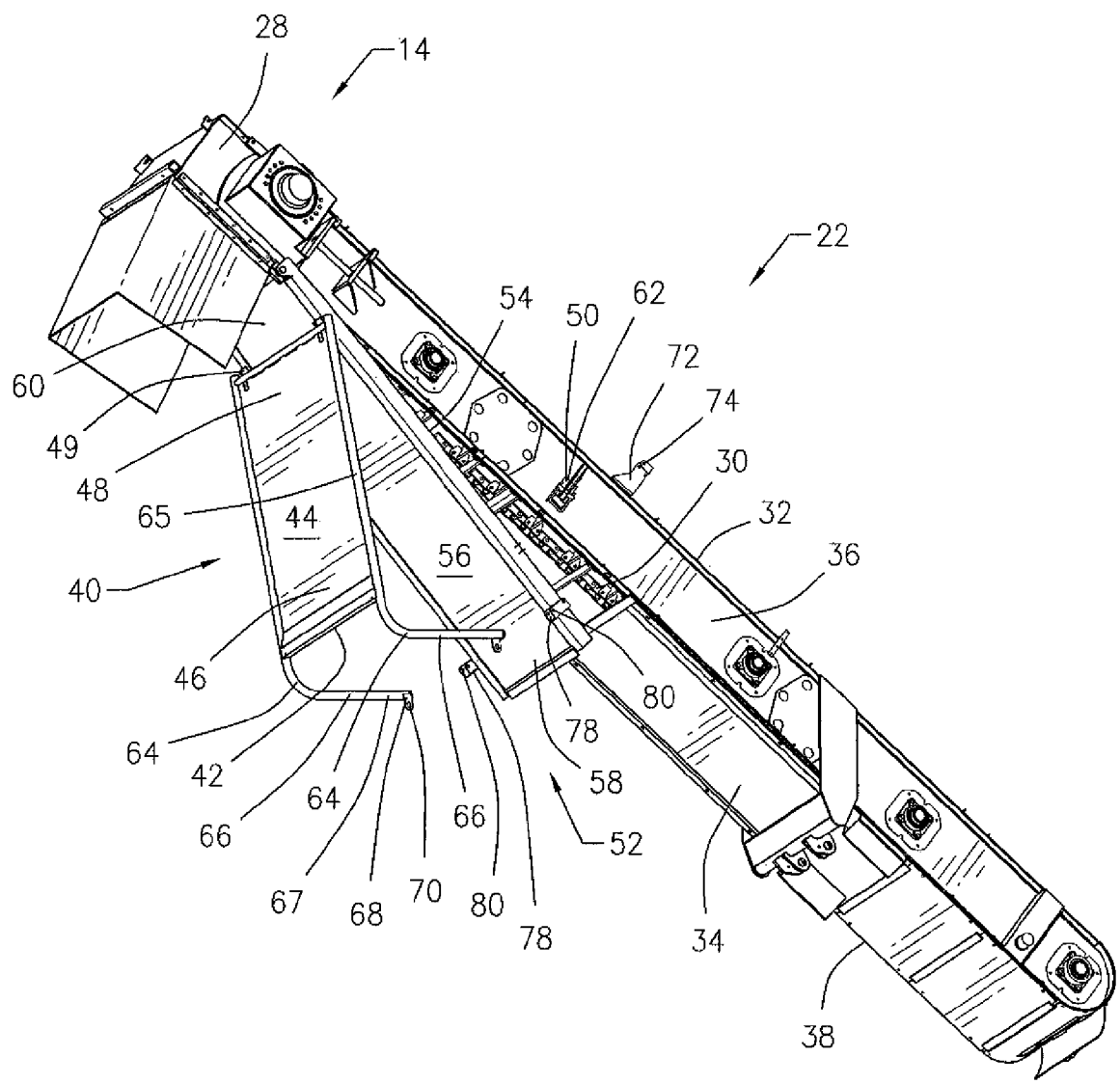
FIG. 2 is a partial cutaway perspective view showing a transport conveyor utilizing the cleanout assembly of the present invention.

As shown in FIG. 2, transport conveyor 22 comprises a housing 28 and a conveyor chain 30. Housing 28 is preferably rectangular and includes upper surface 32, lower surface 34 and side surfaces 36, 38. Conveyor chain 30 is conventional and preferably capable of bidirectional rotation.

Lower surface 34 of transport conveyor housing 28 proximate discharge end 14 comprises a detachable outer panel 40 having an upward facing surface 42, a downward facing surface 44, a first end 46 and a second end 48. Detachable outer panel 40 is preferably rectangular and is preferably substantially the same width as, or only slightly narrower than, housing 28. First end 46 is releasably secured to housing 28, and means 50 is provided for releasing first end 46 from housing 28. Means 50 can be any conventional latch or latching apparatus, such as a 1500 lb. draw latch, and may include a remote actuator such as a lever or switch.

Second end 48 is hingedly attached to housing 28. This attachment can be via one or more conventional hinges, such as piano hinges, or any other attachment means 49 that permits detachable outer panel 40 to pivot downward from lower surface 34 of housing 28.

Lower surface 34 of housing 28 preferably includes detachable inner panel 52 as illustrated in FIG. 2, but this is not required. Where provided, detachable inner panel 52 has an upward facing surface 54, a downward facing surface 56, a first end 58 and a second end 60. Detachable inner panel 52 is preferably either the same size as or is only slightly smaller than detachable outer panel 40. Detachable inner panel 52 is preferably rectangular, and dimensionally proportional to detachable outer panel 40. First end 58 is releasably secured to housing 28, and means 62 is provided for releasing first end 58 from housing 28. Means 62 can be any conventional latch or latching apparatus, such as a 1500 lb. draw latch, and may include a remote actuator such as a lever or switch. Means 62 may be, but need not necessarily be, the same type as means 50. Means 62 may also be, but need not necessarily be, operably integrated or cooperative with means 50. It will be appreciated that a single latch or latching apparatus may have two or more actions, thereby permitting outer panel 40 to be released selectively from inner panel 52. Double action latches are well known. See, e.g., U.S. Pat. No. 4,960,297.

Second end 60 of detachable inner panel 52 is hingedly attached to housing 28. This attachment can be via one or more conventional hinges, such as piano hinges, or any other attachment means 61 that permits detachable inner panel 52 to pivot downward from lower surface 34 of housing 28. Second end 48 of detachable outer panel 40 and second end 60 of detachable inner panel 52 may share a common pivot axis or point of attachment about housing 28, but this is not required.

Detachable outer panel 40 has at least one support structure. Preferably, the support structure is composed of two roughly L-shaped tubular members 64. The long legs 65 of L-shaped tubular members 64 are secured along opposite sides of detachable outer panel 40 preferably by welding, while the short legs 66 of L-shaped tubular members 64 extend roughly perpendicularly from the plane defined by detachable outer panel 40. Ends 67 of short legs 66 of L-shaped tubular members 64 feature a flange 68 having an aperture 70, preferably located centrally therein. Precise centering of aperture 70 about flange 68 is not required.

Figure 3A:
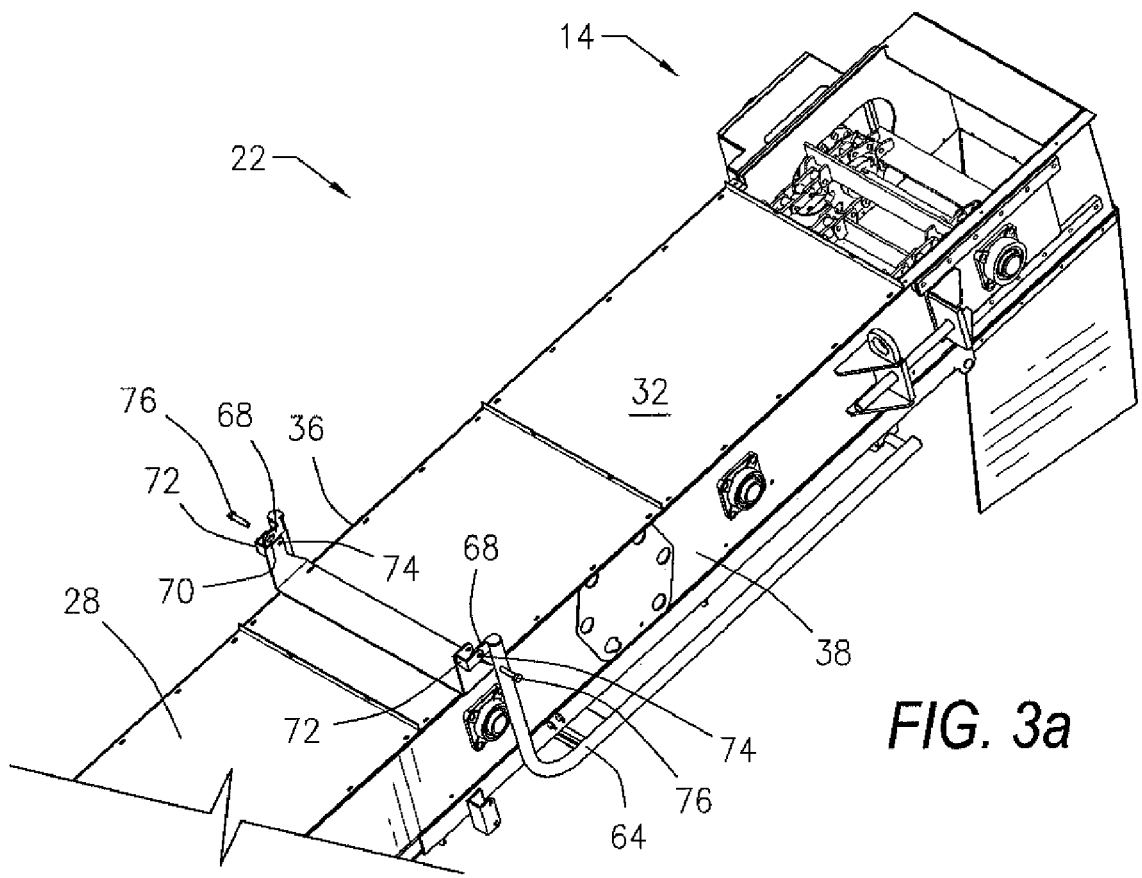
FIGS. 3A, 3B and 3C are perspective, sequential views of an embodiment of the present invention, showing the relationship of the detachable panels to the transport conveyor housing.

When detachable outer panel 40 is in the closed (or up) position (FIG. 3A), L-shaped tubular members 64 extend upward about side surfaces 36, 38 of housing 28. One or more retaining brackets 72 having apertures 74, preferably located centrally therein, are provided at upper surface 32 of housing 28. Precise centering of aperture 74 about bracket 72 is not required. Flanges 68 on ends 67 of L-shaped tubular members 64 may be engaged with retaining brackets 72 and secured to the same using a retaining pin 76 inserted through aperture 70 of flange 68 and aperture 74 of retaining bracket 72.

Figure 3B:
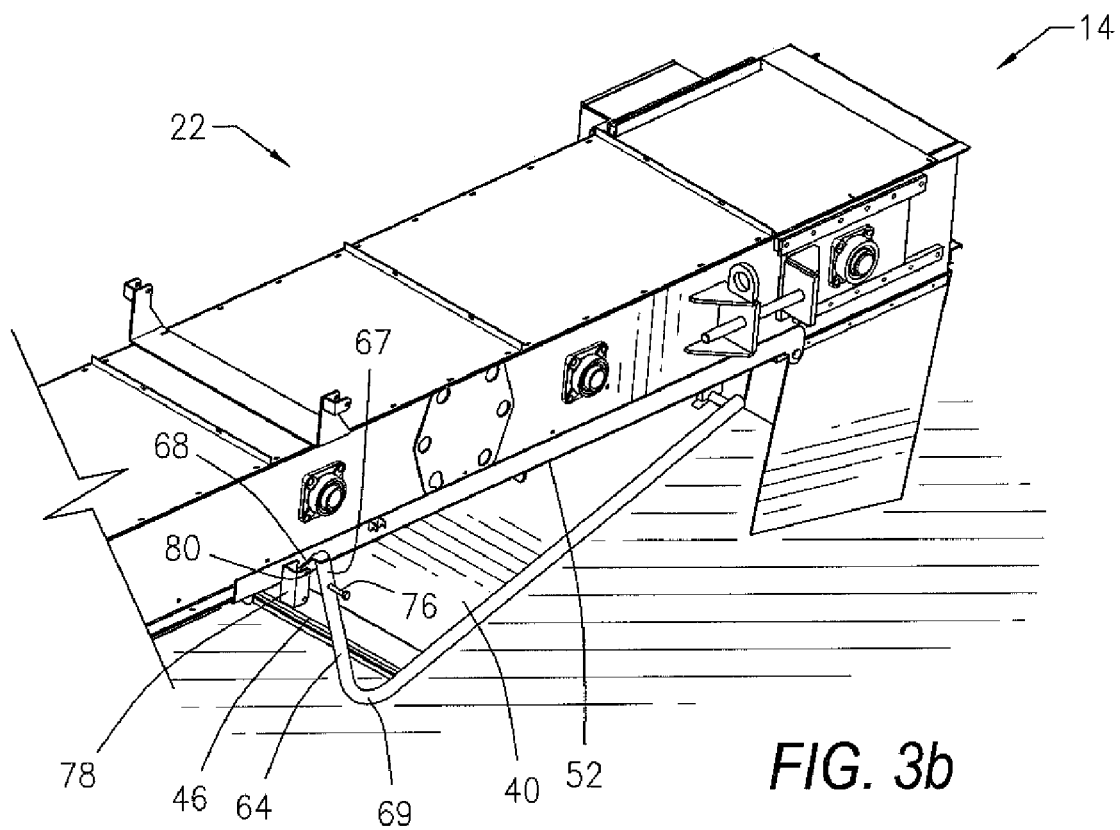

When detachable outer panel 40 is in the open (or down) position (FIGS. 3B, 3C), first end 46 of detachable outer panel 40 contacts the ground. It will be appreciated that the length of detachable outer panel 40 may vary so long as when transport conveyor 22 is level or substantially level to the ground, first end 46 of detachable outer panel 40 contacts the ground as shown. Preferably, portions of L-shaped tubular support members 64 at or around the elbow or 'ell' 69 also contact the ground.

Retaining brackets 78 having apertures 80, preferably located centrally therein, are provided along the sides of detachable inner panel 52. Precise centering of aperture 80 about bracket 78 is not required. Flanges 68 on ends 67 of L-shaped tubular members 64 may be engaged with retaining brackets 78 and secured to the same using retaining pin 76 inserted through aperture 70 of flange 68 and aperture 80 of retaining bracket 78. For convenience, multiple retaining pins 76 may be provided; for example, pins may be secured to MVA 10 at or near each point of insertion (up and down positions), and retained in proximity by a chain or rope of sufficient length, as is well known.

Figure 3C:
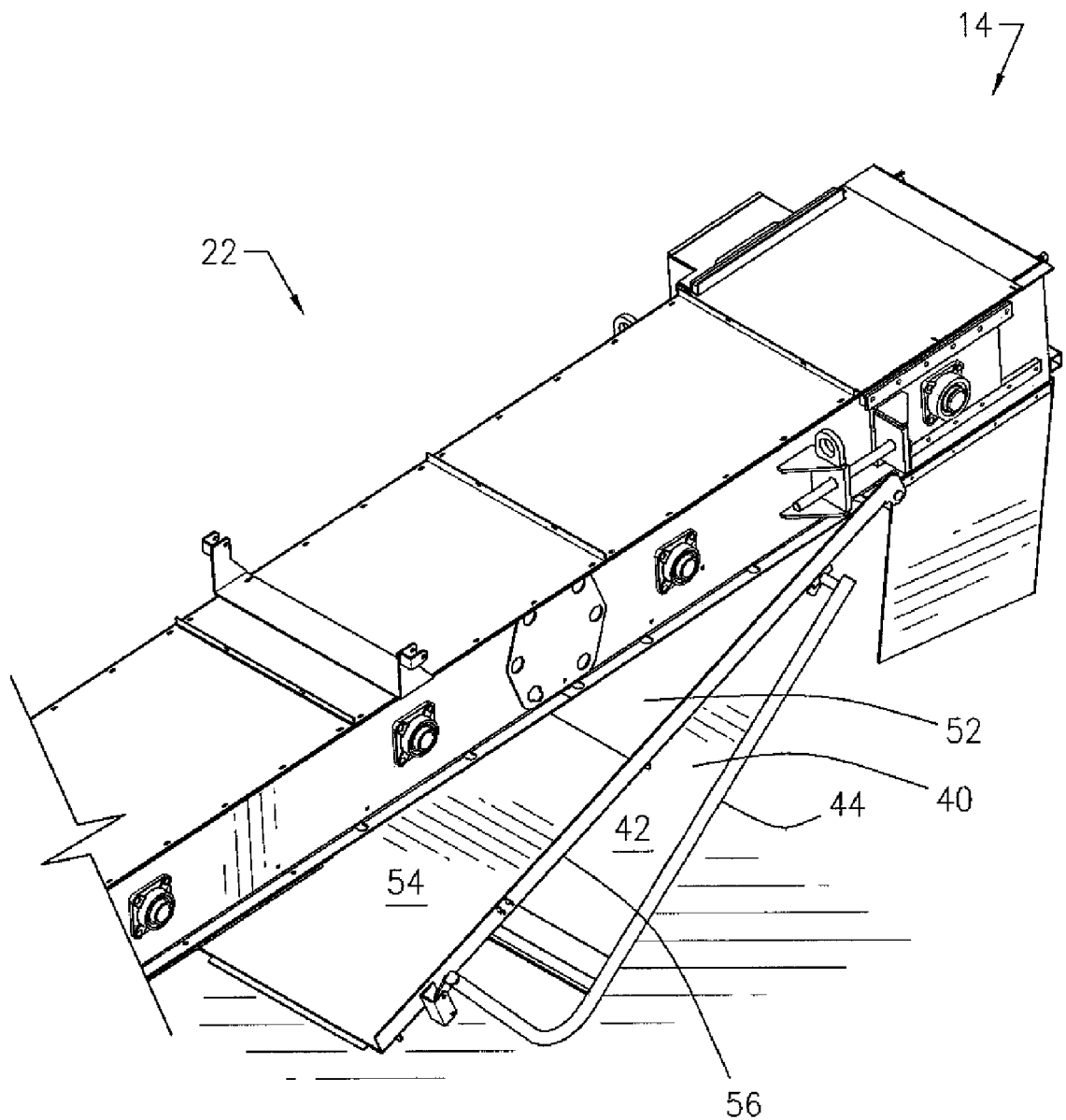
Figure 4:
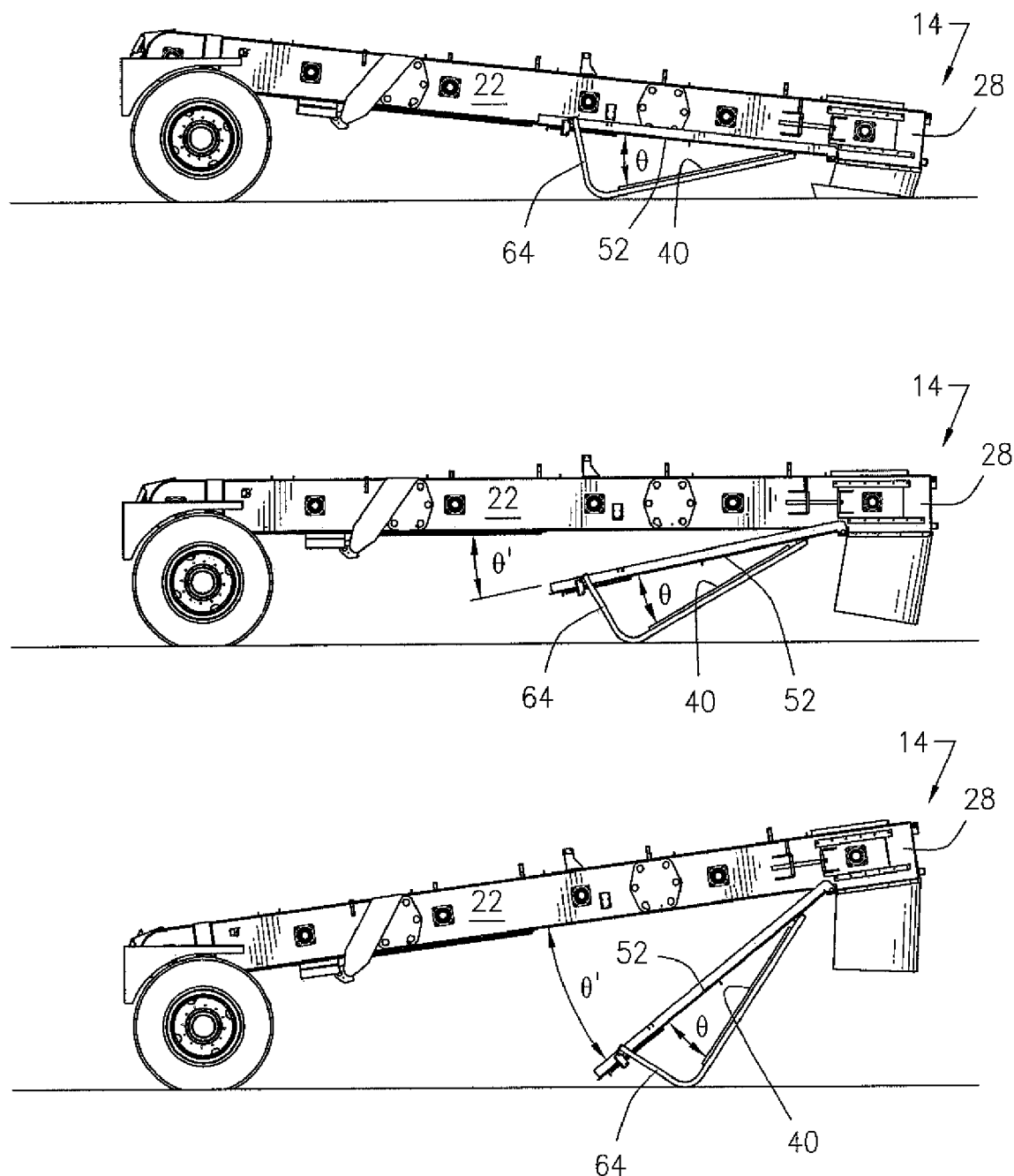
FIG. 4 is a series of perspective side views showing the angular relationship between the detachable panels and the transport conveyor housing as the transport conveyor is raised and lowered.

When both detachable outer panel 40 and detachable inner panel 52 are in the closed (or up) position (FIG. 3A), detachable inner panel 52 is not visible from the outside as it will be obscured by downward facing surface 44 of detachable outer panel 40. When detachable outer panel 40 is in the open (or down) position, and detachable inner panel 52 is in the closed (or up) position (FIG. 3B), the downward facing surface 56 of detachable inner panel 52 will be visible from the outside, but the upward facing surface 54 of detachable inner panel will be in close proximity to conveyor chain 30 within housing 28. When detachable inner panel 52 is in the open (or down) position (FIG. 3C), downward facing surface 56 will face downward toward upward facing surface 42 of detachable outer panel 40, and upward facing surface 54 of detachable inner panel 52 will be visible. It will be appreciated that detachable inner panel 52 necessarily cannot be in a condition that is more open or down than detachable outer panel 40. As illustrated in FIG. 4, it will further be appreciated that once support 64 is secured to detachable inner panel 52, the angular relationship Θ between detachable outer panel 40 and detachable inner panel 52 is fixed while the angular relationship Θ' between detachable inner panel 52 and housing 28 may change as transport conveyor 22 is raised or lowered.

Referring back to FIG. 1, control means 82 is provided in the form of an operator station platform situated over MTV 10, by which the rotation of conveyor chain 30, inter alia, is controlled. Control means 82 is conventional and known in the art, and is utilized generally to selectively actuate and monitor performance of MTV 10, including the movement of the vehicle, the pivot, raising and lowering of its components, and the advancing of its conveyors. For convenience, a second redundant control panel (not shown) may be provided on MTV 10 at a position such that it may be operated by an operator standing on the ground and provide all or some of the functionality of control means 82. By actuating control means 82, conveyor chain 30 may be advanced in either a forward or a reverse direction relative to detachable inner panel 52 and detachable outer panel 40.

It will be appreciated that when detachable inner panel 52 is in the open or down position (FIG. 3C), as conveyor chain 30 advances, loose or substantially loose paving material or HMA will fall onto the upward facing surface 54 of detachable inner panel 52. Material that does not fall can be freed and withdrawn through the opening in lower surface 34 of housing 28. It will be appreciated that safety concerns may require that only suitable tools be inserted (versus workers' hands, for example), and only while conveyor chain 30 is stationary or rotating at a sufficiently slow rate.

Figure 5:
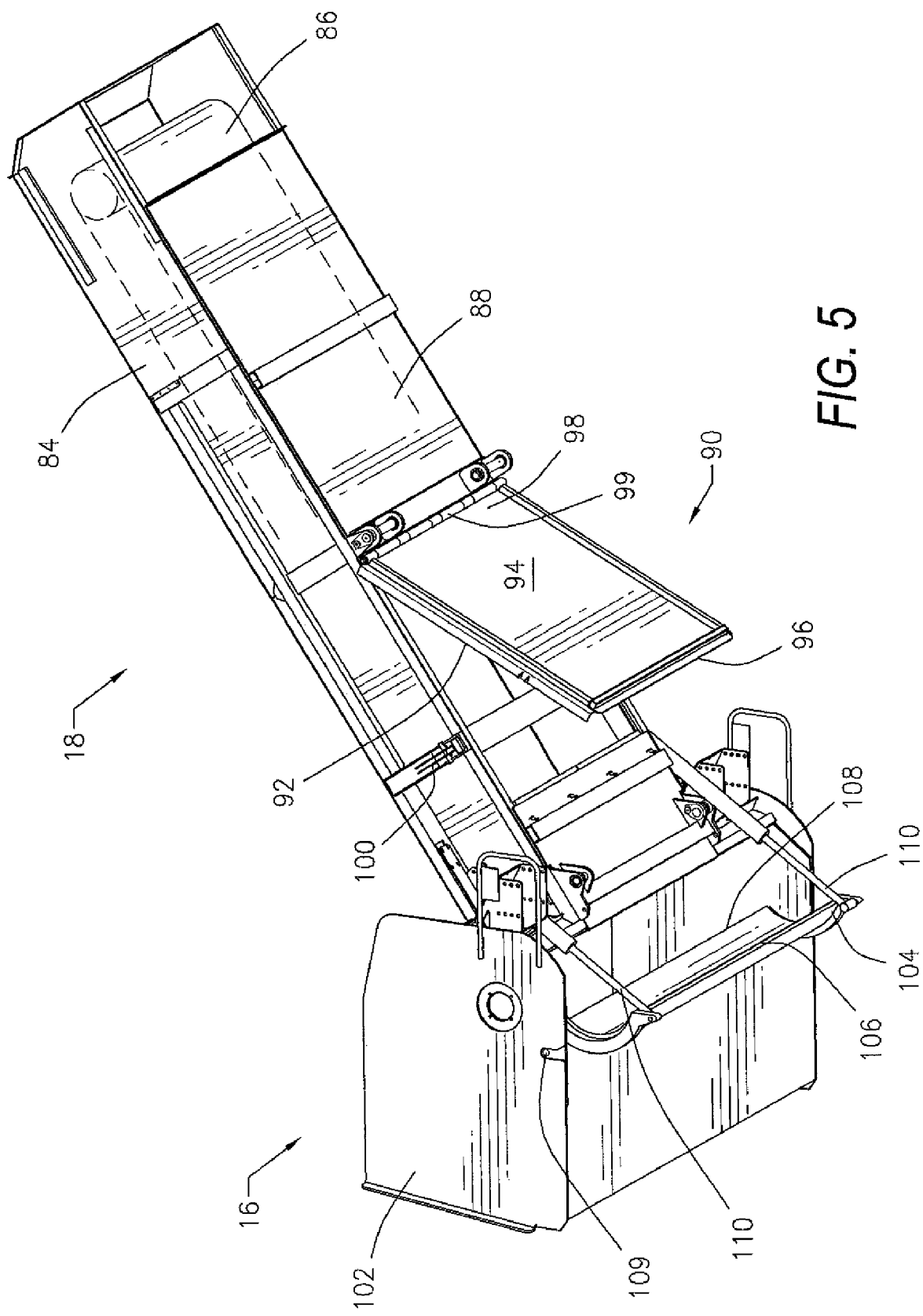
FIG. 5 is a partial cutaway perspective view of an embodiment of the present invention showing a cleanout assembly integrated with an elevator conveyor and a dump hopper.

Turning to FIG. 5, elevator conveyor 18 comprises a housing 84 and conveyor chain 86. Housing 84 is preferably rectangular and includes lower surface 88. Conveyor chain 86 is conventional and preferably capable of bidirectional rotation. Not shown are one or more augers at the base of elevator conveyor 18 that assist in the introduction of material from dump hopper 16 into elevator conveyor chain 86 in a conventional manner.

Lower surface 88 of elevator conveyor housing 84, proximate dump hopper 16, comprises a detachable outer panel 90 having an upward facing surface 92, a downward facing surface 94, a first end 96 and a second end 98. Detachable outer panel 90 is preferably rectangular and is preferably substantially the same width as, or only slightly narrower than, housing 84. First end 96 is releasably secured to housing 84, and means 100 is provided for releasing first end 96 from housing 84. Means 100 can be any conventional latch or latching apparatus, such as a 1500 lb. draw latch, and may include a remote actuator such as a lever or switch.

Second end 98 is hingedly attached to housing 84. This attachment can be via one or more conventional hinges, such as piano hinges, or any other attachment means 99 that permits detachable outer panel 90 to pivot downward from lower surface 88 of housing 84.

As discussed above with respect to transport conveyor 22, and utilizing control means 82, elevator conveyor chain 86 may be advanced in one or both directions while detachable outer panel 90 is in the open (or down) position so as to optimize removal of material from elevator conveyor 18. Augers at the base of elevator conveyor 18 may also be selectively actuated to ensure optimal clean-out. Material that is not loose or that does not self-loosen as elevator conveyor 18 moves may be loosened and removed mechanically or manually from elevator housing 84, preferably by using safe practices. First end 96 of detachable panel 90 typically will not reach the ground in the open (or down) position, but this is not a limitation either way.

Dump hopper 16 is also provided with a clean-out assembly. Still referring to FIG. 5, dump hopper 16, which generally has an open top, comprises a dump hopper housing 102 having a detachable panel 104 that is releasably secured to dump hopper housing 102 at a first end 106 and is hingedly attached to dump hopper housing 102 at a second end 108. This attachment can be via one or more conventional hinges, such as piano hinges, or any other attachment means 109 that permits detachable outer panel 104 to pivot downward from housing 102. Means 110 such as hydraulic or pneumatic cylinders are also provided to assist in the opening and closing of detachable panel 104, and to hold detachable panel 104 in a desired (e.g., open or closed) position. Preferably, the width of detachable panel 104 is substantially the same as or only slightly narrower than the width of dump hopper housing 102. Persons skilled in the art will appreciate that a panel of this width is optimal for cleanout efficiency, as the need for manual clearing of material, which may be hot or otherwise hazardous, is minimized.

Figure 7:
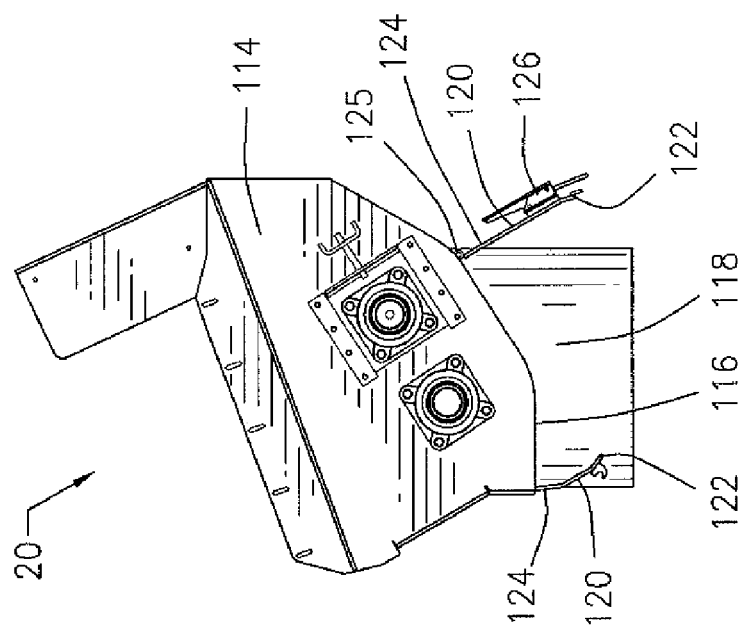
FIG. 7 is a perspective side view of a cleanout assembly integrated with a re-mix hopper.
Figure 6:
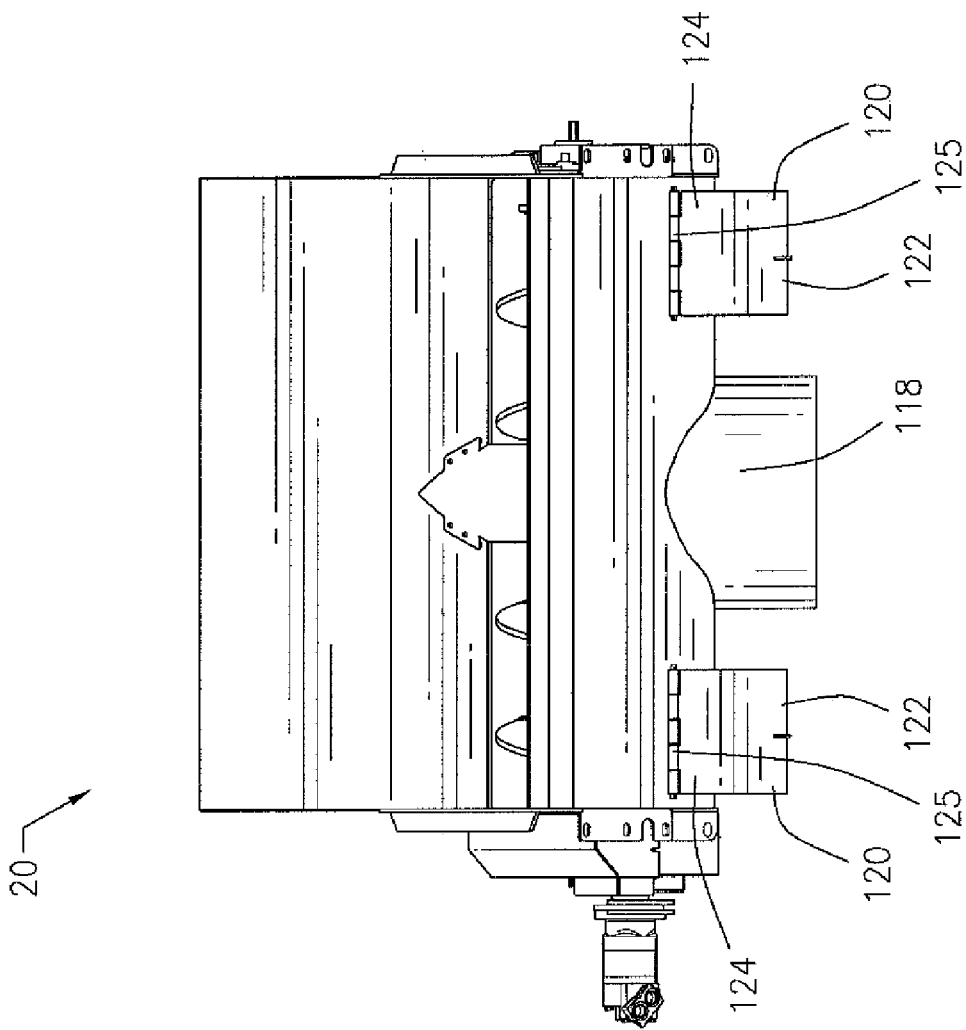
FIG. 6 is a perspective view of an embodiment of the present invention showing a cleanout assembly integrated with a re-mix hopper.

Re-mix hopper 20 is also provided with a clean-out assembly. With respect to FIGS. 6 and 7, re-mix hopper 20 comprises re-mix hopper housing 114, which further comprises a lower surface 116 surrounding a roughly central, roughly cylindrical hopper bottom opening 118. Not shown is an auger that serves to agitate, mix and desegregate paving material such as HMA. Hopper bottom opening 118 acts as a chute for delivering material from re-mix hopper 20 to transport conveyor 22. Pairs of detachable panels 120 are provided on either side of hopper bottom opening 118, and are preferably the same width or only slightly narrower than their respective side of lower surface 116. (In other words, each respective side=½ of width$_{lower\ surface\ 116}$ minus ½ of diameter$_{hopper\ bottom\ opening\ 118}$). Each pair of detachable panels 120 are releasably secured to one another at a first end 122 and are hingedly attached to housing 114 at a second end 124. This attachment can be via one or more conventional hinges, such as piano hinges, or any other attachment means 125 that permits detachable outer panels 120 to pivot downward from housing 114. Means 126 such as conventional, 500 lb. draw latches are provided for releasing the first ends 122 of corresponding detachable panels 120.

In operation, MVA 10 is used in a conventional manner until such time that clean-out of one or more components is desired either at the end of a particular job or for routine maintenance or for repairs. MVA 10 is removed to a designated clean-out location or otherwise appropriate site. L-shaped tubular members 64 are disengaged from retaining brackets 72 by removing retaining pins 76. Means 50 is actuated, thereby releasing detachable outer panel 40, and panel 40 is lowered until second end 46 of panel 40 contacts the ground. L-shaped tubular members 64 are engaged with and secured to retaining brackets 78 using retaining pins 76 and means 62 is actuated, releasing detachable inner panel 52. Transport conveyor 22 is pivoted upward until detachable inner panel 52 roughly bisects the angle between transport conveyor 22 and detachable outer panel 40 (FIG. 3C).

Conveyor chain 30 is actuated in one or both directions. Loose material falls from conveyor chain 30 onto the upward facing surface 54 of detachable inner panel 52, and may be removed by workers using shovels, scrapers or other suitable tools. Material that does not fall merely by gravity may be loosened and freed from conveyor chain 30 by manual and/or mechanical means. Conveyor chain 30 is moved at least one complete rotation to ensure optimum material removal.

Once clean-out is complete, transport conveyor 22 is lowered until once again substantially level with the ground. Inner panel 52 is raised and secured by means 62. L-shaped tubular members 64 are disengaged from retaining brackets 78. Detachable outer panel 40 is raised and secured by means 50. L-shaped tubular members 64 are secured to retaining brackets 72.

Similarly, elevator conveyor 18 is cleaned by releasing the detachable outer panel 90 from the elevator housing 84 via means 100. Elevator conveyor chain 86 may be advanced in one or both directions and loose material falls onto the upward facing surface 92 of panel 90 and may be removed manually by shovels or other appropriate tools. Material that does not fall may be removed directly from conveyor chain 86. Detachable panel 90 is then engaged with elevator housing 84 and secured by means 100.

Clean-out of dump hopper 16 and re-mix hopper 20 does not necessarily involve the actuation of a conveyor, but both may be cleaned by releasing the respective detachable outer panels and removing material from the respective housings before re-securing the panel(s) to the housing(s). It will be appreciated that dump hopper 16 and re-mix hopper 20 may collect additional material during the cleaning of elevator conveyor 18, and as such it may be preferable to perform the clean-out of dump hopper 16 and re-mix hopper 20 subsequent to the clean-out of elevator conveyor 18. With regard to sequence, it may also be preferable to clean out transport conveyor 22 after other components as material may be dislodged from or through re-mix hopper 20 during the cleaning thereof, said material perhaps finding its way into transport conveyor 22. In addition to the conveyors, various augers such as those integral with elevator conveyor 18 and re-mix hopper 20 may be selectively actuated to ensure optimal material removal from the entire system of MTV 10. No limitation as to sequence is implied.

Thus, the present invention has been described in an illustrative manner. It is to be understood that the terminology that has been used is intended to be in the nature of words of description rather than of limitation. Furthermore, whereas the present invention has been described in relation to the drawings attached hereto, it should be understood that other and further modifications, apart from those shown or suggested herein, may be made within the spirit and scope of this invention.

What I claim is:

1. An apparatus for conveying and desegregating hot mix asphalt comprising:
    a plurality of interconnected housings, each having a lower surface, the plurality of interconnected housings comprising a first housing having a conveyor disposed therein, wherein said lower surface of said first housing comprises at least one outer panel, and wherein said conveyor is either an elevator conveyor or a transport conveyor;
    said at least one outer panel being at least partially detachable from said housing and releasably secured at a first end of said at least one outer panel,
    means for releasing the first end of said at least one outer panel from said housing.

2. The apparatus of claim 1 wherein said means for releasing the first end of said at least one outer panel from said first housing comprises a latch.

3. The apparatus of claim 1 wherein said conveyor is a transport conveyor, said plurality of interconnected housings comprises:
    a second housing defining a dump hopper;
    a third housing having an elevator conveyor disposed therein; and
    a fourth housing defining a re-mix hopper.

4. The apparatus of claim 3 wherein said lower surface of said second housing comprises at least one at least partially detachable outer panel.

5. The apparatus of claim 4 wherein said lower surface of said second housing further comprises means for releasing a first end of said at least one outer panel from said second housing.

6. The apparatus of claim 3 wherein said lower surface of said third housing comprises at least one at least partially detachable outer panel.

7. The apparatus of claim 6 wherein said lower surface of said third housing further comprises means for releasing a first end of said at least one outer panel from said third housing.

8. The apparatus of claim 3 wherein said lower surface of said fourth housing comprises at least one at least partially detachable outer panel.

9. The apparatus of claim 8 wherein said lower surface of said fourth housing further comprises means for releasing a first end of said at least one outer panel from said fourth housing.

10. The apparatus of claim 3 wherein said lower surface of said first housing further comprises an inner panel releasably secured, at a first end of said inner panel, to said first housing and pivotally attached, at a second end of said inner panel, to said first housing, and means for releasing the first end of said inner panel from said first housing.

11. The apparatus of claim 10 wherein said means for releasing the first end of said outer panel and said means for releasing the first end of said inner panel are cooperative.

12. The apparatus of claim 11 wherein said means for releasing the first end of said outer panel and said means for releasing the first end of said inner panel comprise a single, double-action latch.

13. The apparatus of claim 10 wherein said first housing further comprises an upper surface and side surfaces extending vertically between said upper and lower surfaces.

14. The apparatus of claim 13 wherein said outer panel of said first housing further comprises a support member releasably secured to one of said first housing and said inner panel of said first housing.

15. The apparatus of claim 14 wherein said support member is releasably secured to one of said upper surface of said first housing and said inner panel of said first housing.

16. An apparatus for conveying and desegregating hot mix asphalt comprising:
    a first housing defining a dump hopper having a lower surface and at least one at least partially detachable panel in said lower surface, said at least one panel releasably secured, at a first end of said at least one panel to said first housing and pivotally attached, at a second end of said at least one panel, to said first housing;

means for releasing the first end of said at least one panel from said first housing;

a second housing connected to said first housing, said second housing having an elevator conveyor disposed therein and a lower surface, said lower surface further comprising at least one at least partially detachable panel in said lower surface, said at least one panel releasably secured, at a first end of said at least one panel, to said second housing and pivotally attached, at a second end of said at least one panel, to said second housing;

means for releasing the first end of said at least one panel from said second housing;

a third housing connected to said second housing, said third housing defining a re-mix hopper having a lower surface and at least one at least partially detachable panel in said lower surface, said at least one panel releasably secured, at a first end of said at least one panel, to said third housing and pivotally attached, at a second end of said at least one panel, to said third housing;

means for releasing the first end of said at least one panel from said third housing;

a fourth housing having a transport conveyor disposed therein, an upper surface, a lower surface, and side surfaces extending vertically between said upper and lower surfaces; said lower surface further comprising an outer panel and an inner panel, wherein each panel is releasably secured, at a first end of said panel, to said fourth housing and pivotally attached, at a second end of said panel, to said fourth housing;

means for releasing the first end of said outer panel from said fourth housing;

means for releasing the first end of said inner panel from said fourth housing;

and said outer panel of said fourth housing further comprising a support member releasably secured to one of said fourth housing and said inner panel of said fourth housing.

17. A method for cleaning out an apparatus for conveying and desegregating hot mix asphalt comprising the steps of:

releasing a first end of at least one panel from each of a plurality of housings, at least one housing of which contains a conveyor;

advancing said conveyor at least one full revolution;

advancing said conveyor in the opposite direction;

collecting loose paving material from each of said plurality of housings;

removing said loose paving material from each of said plurality of housings; and securing the first end of each said at least one panel to its corresponding housing.

18. The method of claim 17 further comprising the step of actuating at least one auger contained within at least one of said housings.

* * * * *